United States Patent [19]

McEwen et al.

[11] Patent Number: 5,158,691

[45] Date of Patent: Oct. 27, 1992

[54] FILTER APPARATUS AND METHOD FOR FILTERING CONTAMINANTS FROM MACHINE TOOL COOLANT

[75] Inventors: Stephen N. McEwen, Bowling Green; Jay M. Creps, Rudolph; Scott M. McEwen, Bowling Green, all of Ohio

[73] Assignee: Henry Filters, Inc., Bowling Green, Ohio

[21] Appl. No.: 575,338

[22] Filed: Aug. 30, 1990

[51] Int. Cl.$^5$ ............ B01D 33/46; B01D 33/06; B01D 33/21; B01D 33/15

[52] U.S. Cl. ............ 210/791; 210/396; 210/402; 210/498; 210/499; 210/780; 210/784

[58] Field of Search .......... 210/396, 402, 780, 496, 210/498, 499, 784, 346, 347, 486, 331, 767, 791; 29/163.8

[56] References Cited

U.S. PATENT DOCUMENTS

| | | |
|---|---|---|
| 1,540,325 | 6/1925 | Fuller .................................. 210/498 |
| 2,165,931 | 7/1939 | Levy .................................... 210/347 |
| 3,096,278 | 7/1963 | Francom .............................. 210/331 |
| 3,283,906 | 11/1966 | Crane et al. ........................ 210/347 |
| 3,708,848 | 1/1973 | Guinard .............................. 29/163.8 |
| 4,083,787 | 4/1978 | White ................................... 210/402 |
| 4,131,549 | 1/1978 | Peterson .............................. 210/396 |
| 4,793,923 | 12/1988 | Kadoya et al. ..................... 210/496 |
| 4,836,917 | 6/1989 | Tomita et al. ...................... 210/396 |
| 4,932,112 | 6/1990 | Tikkanen ............................ 210/498 |
| 4,957,630 | 9/1990 | Bratten ................................ 210/402 |

Primary Examiner—Robert A. Dawson
Assistant Examiner—Sun Uk Kim
Attorney, Agent, or Firm—Brooks & Kushman

[57] ABSTRACT

A filter apparatus (10) for filtering machine tool coolant is disclosed as including a filter assembly (12) including a foraminous non-reticulated metal screen (30) having minute openings and a smooth planar surface for providing improved scrape cleanability and preventing movement of machining chips, particulate and also elongate contaminants from one side of the filter (12) to the other side thereof.

8 Claims, 3 Drawing Sheets

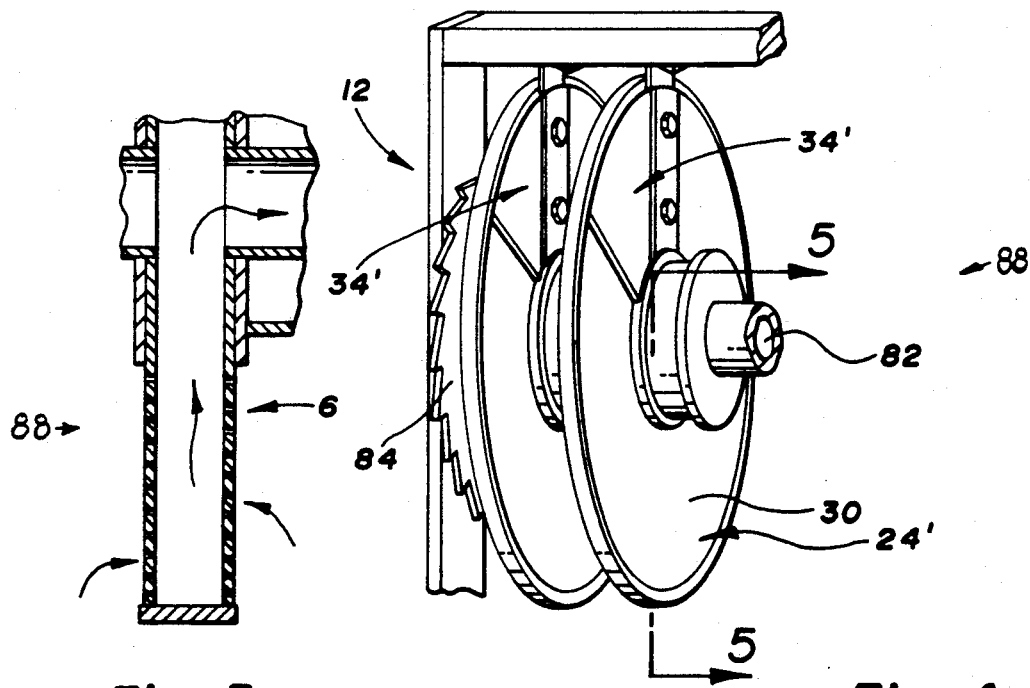
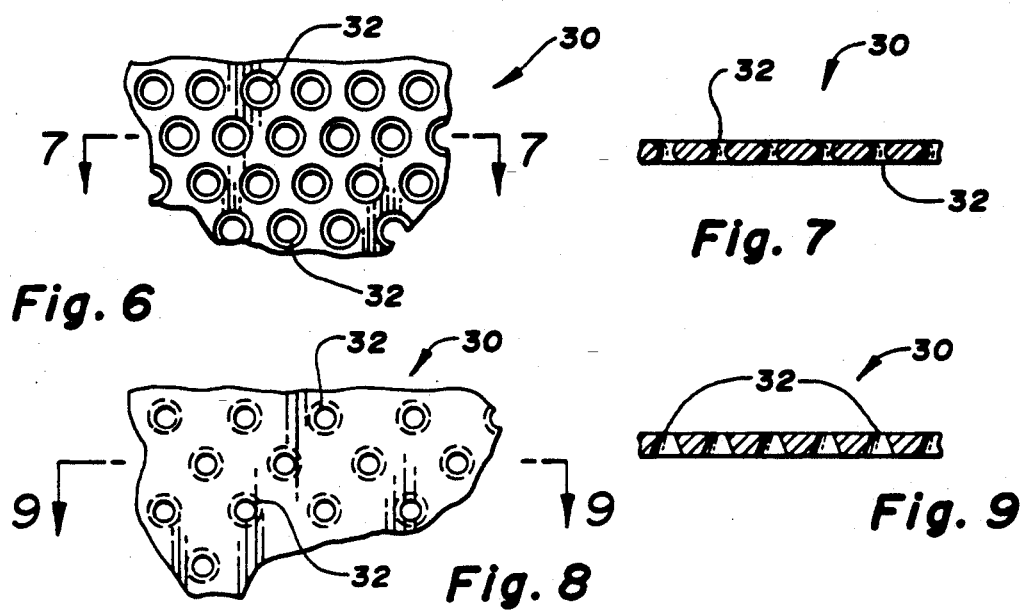

FILTER APPARATUS AND METHOD FOR FILTERING CONTAMINANTS FROM MACHINE TOOL COOLANT

TECHNICAL FIELD

This invention relates to filters for filtering industrial liquids such as machine tool coolants and more particularly to filtering elongated contaminants onto a foraminous surface.

BACKGROUND ART

Conventional filter apparatus utilized in machine tool operations of the type described in U.S. Pat. Nos. 4,507,061 and Re. 32,135 separate machine tool chips and other contaminants from coolant so that clean coolant may be returned to the machine tools for reuse. Often times, the contaminants are very small and of an elongated shape. Usually one or more horizontally disposed filter drums are located adjacent the bottom of a settlement tank. A suction is provided by a pump to the interior of the filter drum to pull coolant through the filter element to move the coolant from one side of the filter to the other. Filter cake, comprised of small chips and other contaminants, is formed on the outside of the drum surface. The drum is periodically indexed to enable a doctor blade to scrape off a portion of the accumulated filter cake, which drops to the bottom of the tank for removal by a dragout conveyor.

The conventional filter element is comprised of a continuous length of wedge shaped wire wrapped around a drum-shaped support. The filter element thereby includes elongated openings through which some elongated contaminants are allowed to pass if the contaminants are aligned in the direction of fluid movement as they strike the filter. The passage of these elongate contaminants allows the contaminants that pass through the filter to be recirculated to the machine tools.

An alternate type filter system that has been tried is fabricated from rectilinear mesh, wire cloth or the like. Although the minute square openings formed by the woven wire cloth are effective in preventing the passage of elongate contaminants, the surface is not a flat planar surface and thus becomes clogged when scrape cleaning is attempted.

DISCLOSURE OF INVENTION

An object of the present invention is to provide an improved filter apparatus for filtering industrial liquid such as machine tool coolant.

A further object of the invention is to provide an improved filter apparatus having a filter that provides improved scrape-cleanability of the filter surface.

A still further object of the invention is to provide a filter element that prevents movement of machining chips, particulate and also elongate contaminants found in machine tool coolant from one side of the filter to the other side.

In carrying out the above objects and other objects of the invention, the filter apparatus includes a horizontal rotatable cylindrical drum filter in a settlement tank having a dragout conveyor. The settlement tank contains industrial liquids such as machine tool coolant or the like containing machining chips. These chips are found in a wide spectrum of particle sizes and shapes, including elongate contaminants. A circulating pump creates suction on one end of the drum filter. The drum filter has a foraminous surface comprised of a non-reticulated metal screen having minute openings and having a smooth planar surface. A doctor means is provided for scraping the foraminous surface to remove deposited contaminants. The minute openings in the foraminous surface are generally in the range of between 50 and 250 microns and provide improved scrape cleanability to the surface while preventing movement of machining chips (particulate including elongate contaminants) from one side of the filter to the other side.

In a preferred embodiment of the invention, minute openings are generally 120 microns. In one arrangement of the preferred embodiment, the minute openings in the direction of movement are conical in shape tapering outwardly in the direction of movement. In an alternative embodiment, the minute openings in the direction of movement are hourglass in shape.

A method for filtering machine tool coolant contaminants including the elongate contaminates from the industrial liquid includes the steps of interposing a foraminous filter surface perforated with a plurality of minute openings configured to pass the fluid while preventing passage of contaminant into a flow of the contaminated industrial liquid.

The objects, features, and advantages of the present invention are readily apparent from the following detailed description of the best mode for carrying out the invention when taken in connection with the accompanying drawings.

BRIEF DESCRIPTION OF THE DRAWINGS

FIG. 4 is a perspective partial view of a disc filter assembly substitutable for the drum filter assembly in the filter system of FIG. 1;

FIG. 5 is a sectional plan view taken along lines 5—5 in FIG. 4 of a disc filter element of the disc filter assembly of illustrating communication of the machine tool coolant;

FIG. 6 is an exploded planar view taken along arrow 6 in FIGS. 3 and 5 illustrating a section of a first embodiment of the foraminous non-reticulated surface of the filters of the present invention;

FIG. 7 is a cross-sectional view taken along lines 7—7 in FIG. 6;

FIG. 8 is an exploded planar view like FIG. 6 illustrating a second embodiment of the foraminous non-reticulated surface of the filters of the present invention; and FIG. 9 is a cross-sectional view taken along lines 9—9 in FIG. 8.

BEST MODE FOR CARRYING OUT THE INVENTION

Figure 1:
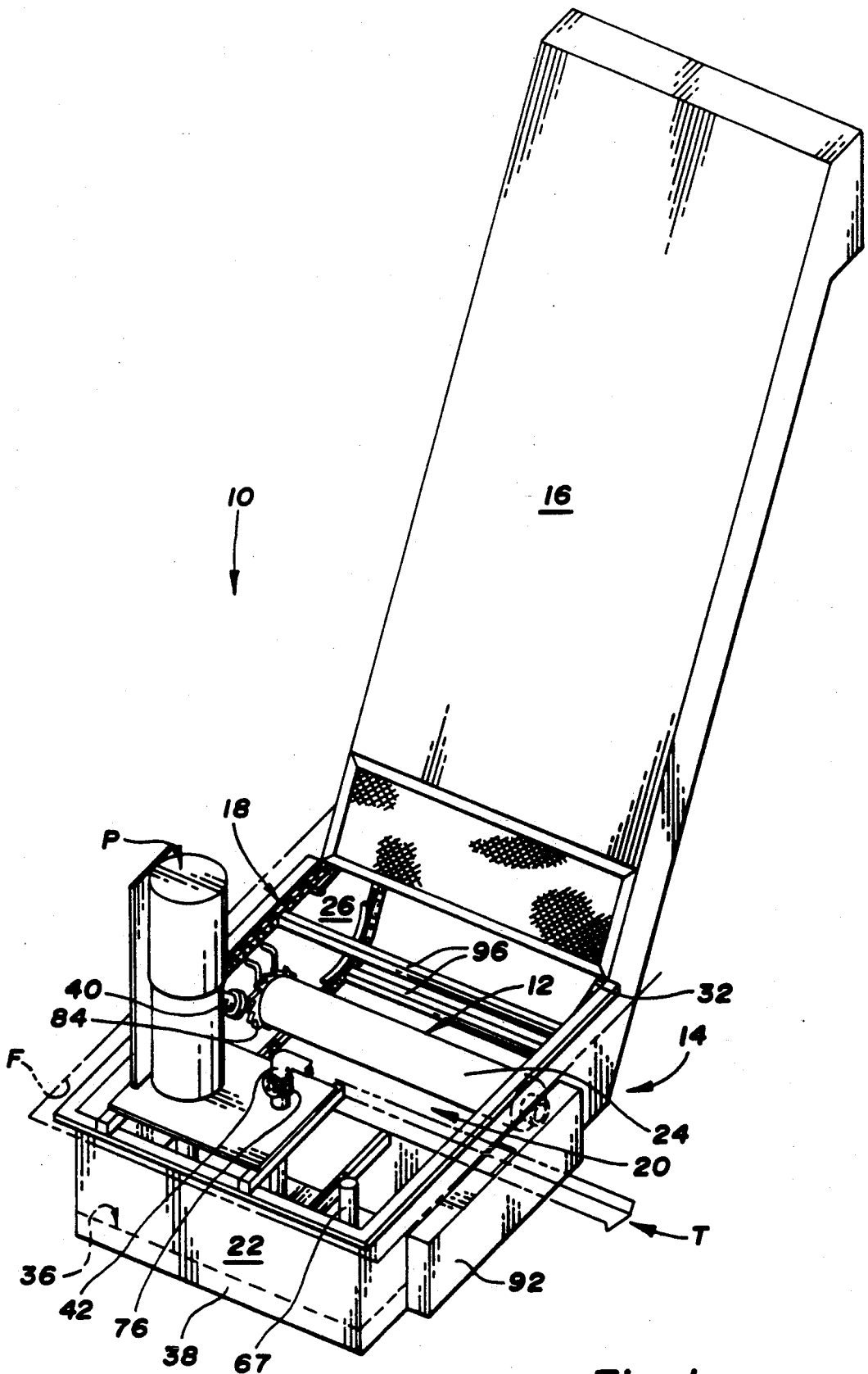
FIG. 1 is a perspective view of a filter system including a removable drum filter having a non-reticulated foraminous surface constructed in accordance with the present invention.

With reference to FIG. 1 of the drawings, a filter apparatus for filtering machine tool coolant constructed in accordance with the present invention is generally indicated by reference numeral 10. As is hereinafter more fully described, apparatus 10 includes a filter assembly 12 which is easier to keep clean and that prevents machining chips, particulate as well as elongate contaminants in the coolant from being recirculated to the machine tools.

Referring again to FIG. 1, a settling tank 14 is set into a pit disposed below the floor level or elevation F in an industrial environment. Tank 14 is generally rectilinear in configuration and has a sloping end wall or ramp 16 for use in conjunction with a dragout conveyor 18. Tank 14 is comprised of two discrete compartments; a dirty or contaminated coolant compartment, designated 20, for receiving dirty coolant from trough T in communication with the machine tools, also not shown; and a clean coolant compartment 22 for receiving clean filtered coolant from tank 14.

Figure 3:
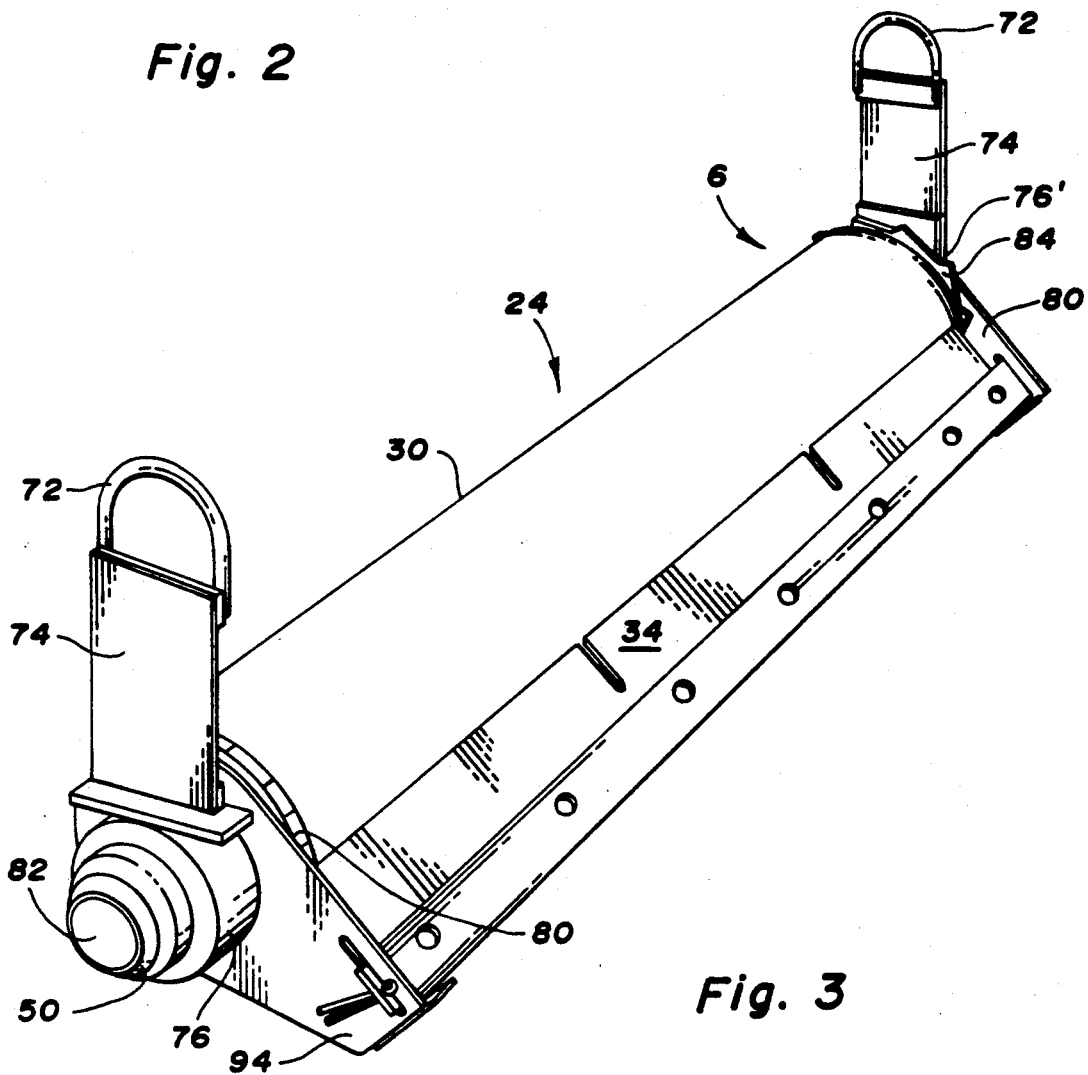
FIG. 3 is a perspective view of the drum filter assembly.

Within dirty coolant compartment 20, there is provided a horizontally disposed drum filter assembly 24 between two parallel sides 26,28 of tank 14 for filtering the dirty coolant whereby clean coolant filtrate may be supplied machine tools as explained hereinafter. Preferably, drum filter 24, as best seen in FIG. 3, has a foraminous surface 30 comprised of a non-reticulated metal screen having minute openings 32, as best seen in FIGS. 6-9, and a smooth planar surface. Minute openings 32 are preferably in the range of between 50 and 250 microns in diameter and most preferably 120 microns. In a first configuration, shown in FIGS. 8 and 9, minute openings 32 in the direction of coolant movement are conical, tapering outwardly. In a second configuration, shown in FIGS. 6 and 7, minute openings 32 in the direction of coolant movement are hourglass in shape.

During operation of the filter apparatus 10, drum filter 24 collects a filter cake composed of machining chips (particulate including elongate contaminants) from machine tool operations about its surface 30. Coolant is moved through the filter cake and surface 30 of the drum filter 24 into the interior of the drum. More particularly, a suction is drawn on the inside of drum 24 by pump P. Coolant in dirty filter tank compartment 20 thus passes through the filter cake and drum, and cleaned or filtered coolant is supplied by the pump P to the machine tools.

Dragout conveyor 18 is conventional in construction and serves to remove both the solids settled out from the coolant and the filter cake removed from the filter drum 24 by a doctor blade 34 shown in FIG. 3, both of which settle to the bottom of tank compartment 20. Doctor blade 34 comprises a non-abrasive material, preferably a flexible plastic material, having a leading edge flexed to contact the surface 30 in a parallel relationship whereby the surface is easily cleaned. The solids removed from the bottom of the tank compartment 20 by conveyor 18 are deposited in a suitable receptacle, not shown, at the end of the conveyor. For present purposes, it will be appreciated that clean coolant is supplied from the interior of the one or more filter drums 24 to the machine tools by operation of the pump P hereof. Clean coolant compartment 22 includes an elevated or false floor 36 above the lower tank wall bottom and which defines a lower chamber 38 for receiving clean coolant from the suction side of filter drum via conduit 40.

Disposed in clean compartment 22 is a main outlet conduit 42 for connection with the machine tools. Thus, clean coolant is supplied the machine tools from the suction side of filter 24 by way of chamber 38, pump P and outlet conduit 42. The purpose of clean coolant compartment 22 is to provide a reservoir of clean coolant which can be supplied the machine tools when the drum filter 24 is indexed for cleaning. Thus, a valve, not shown, is opened affording communication between the clean coolant in chamber 38 and the clean coolant in the remainder of clean coolant compartment 22 above floor 36. In this manner, pump P suction is applied to the clean coolant in compartment 22 to supply coolant to the machine tools. The suction is also removed with respect to the inside of the drum filter assembly 24 to facilitate cleaning filter cake from the outside surface of the drum. Upon closing this valve, pump suction to the filter drum is reestablished, as will become clear from the ensuing description.

Figure 2:
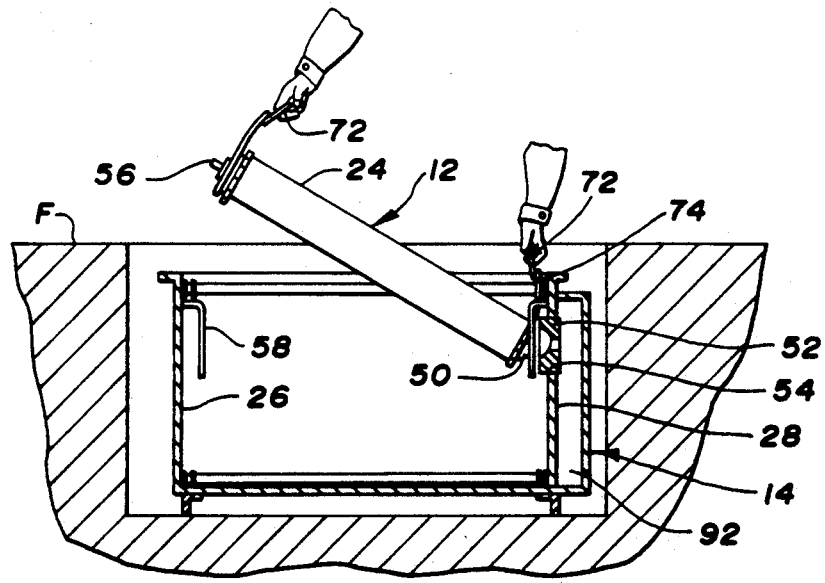
FIG. 2 is a sectional partial plan view of the filter system of FIG. 1 illustrating the removability of a drum filter assembly.

Referring now to FIGS. 2 and 3, drum filter 24 is shown to have axial extensions at each end, one end comprising a ball duct joint 50, the socket 52 of which is placed in an aperture 54 in the side wall 28 of tank 14; and the other end of which filter 24 is provided with a spring axially outwardly pressed cap or pin 56 which in the position shown has an over-all length greater than the distance between the wall 26 and the base of the socket 52 as shown. Thus, when the filter assembly 24 has its ball duct end 50 placed into the socket 52 guided by the U-shaped bracket 58, the other end may have its pin 56 pressed against the wall 26 of the tank 14 so that a resilient means, which may be a compression spring inside an axially aligned sleeve in the drum filter 24, will urge the whole assembly 24 and its ball duct 50 into sealing engagement with the socket 52 anchored in the opposite parallel wall 28 of the tank 14. Since it is not possible to lift the ball duct 50 vertically out of its socket 52 in order to remove the drum filter assembly 24, the opposite end with pin 56 must be lifted first as shown in FIG. 2 so that ample space above the tank 14 is had to remove the ball duct 50 from socket duct 52.

Similarly, in installing the drum filter assembly 24, the same procedure must be followed. If desired, the ends of the drum filter assembly 24 may be provided with lifting handles 72 as shown in FIGS. 2 and 3, in which event it is necessary that the connections 74 between each handle 72 and the non-rotatable bearing ends 76 and 76' should be inwardly directed or flexible plates to permit clearance from the side walls 26 and 28 as shown particularly at the right end of the filter 24.

In a first arrangement of filter apparatus 10 shown in FIGS. 1-3, the filter assembly 12 is a drum filter assembly 24 having foraminous non-reticulated metal screen surface 30 providing the filtering. An end disc 80 is centrally apertured and may be integral through a hollow hub portion 82 with the ball duct 50. Another end disc 84 is also communicable with hollow hub portion 82 and may be peripherally serrated to form a ratchet wheel engageable by a drive means, not shown, for rotating the filter assembly 12 for cleaning.

In a second arrangement of filter apparatus 10, the drum filter assembly 24 shown in FIGS. 1 and 2 is replaced by disc filter assembly 24', shown partially in FIGS. 4 and 5. Filter assembly 24' is a disc filter assembly comprising a plurality of hollow disk filter elements 88 spaced along and in communication with hub portion 82 which can, in number, increase the filter surface area as compared to a drum filter of the same volume. Each disk filter element 88 includes the same foraminous surface 30 and an adapted doctor blade 34' for scraping the surface. As seen in FIG. 5, coolant is communicated through surface 30 of disk filter 88, whereby machining chips, particulate as well as elongated contaminants form a filter cake on the surface, and is passed through the hollow disc and into hub 82.

In either construction, clean liquid which passes through the surface 30 can flow unobstructedly out through the apertured disc 80 and hub 82, ball duct 50 and socket duct 52 into a suction duct 92 which may comprise a separate chamber on the outside of the wall 28 of the settling tank 12.

The stationary bearing means 76 and 76' are provided with radially outwardly extending flanged wing portions 94 for adjustably supporting the flexible plastic scraping or doctor blades 34,34' against the outer filter surface 30. The non-abrasive doctor blades 34,34' remove the fine solid particles that accumulate and form a filter cake on the foraminous non-reticulated surface 30 when the filter 24,24' is indexed at intervals by the drive means. During this operation, the suction in duct 92 is reduced to aid in allowing the removed particles to settle and be carried out by flights 96 of the conveyor.

While the best mode for carrying out the invention has been described in detail, those familiar with the art to which this invention relates will recognize various alternative embodiments for practicing the invention as defined by the following claims.

What is claimed is:

1. An immersible filter apparatus for machine tool coolant collected into a settlement tank, the filter apparatus comprising:
   a hollow hub portion having a horizontal axis through which machine tool coolant moves;
   a plurality of hollow disk filter elements each having a foraminous, smooth planar surface having openings therein, rotatable about said axis and spaced along and in communication with the hollow of said hub portion for collecting on said surface contaminants from machine tool coolant moving, in a direction of movement, from outside each said filter element into the hollow of the hub portion thereof, said openings being hourglass in shape in the direction of movement; and
   doctor means for scraping each foraminous surface to remove collected contaminants from the surface of each said filter element with an improved scrape cleanability due to the smooth, planar characteristic thereof, whereby to cause the removed contaminants to drop down into the settlement tank.

2. Apparatus as in claim 1 wherein said openings are in the range of between 50 and 250 microns.

3. Apparatus as in claim 2 wherein said openings are 120 microns.

4. A filter apparatus as in claim 1 wherein said doctor means are flexible plastic blades.

5. A filter apparatus as in claim 4 wherein said blades include a leading edge contacting said filter surface in a generally parallel relationship.

6. A filter apparatus as in claim 1 further including means for moving the machine tool coolant from the outside of each element into the hollow thereof and subsequently through said hub.

7. A method for filtering contaminants from machine tool coolant comprising the steps of:
   interposing a hollow disk filter element having a hollow hub portion rotatable about a horizontal axis and also having a foraminous smooth planar surface including openings having an hourglass shape through said surface in contaminated machine tool coolant;
   drawing the machine tool coolant from outside the filter element into the hollow hub portion;
   collecting on the surface contaminants from the machine tool coolant;
   rotating the filter element; and
   scraping the surface of the filter element to remove collected contaminants from the surface.

8. An immersible apparatus for machine tool coolant collected into a settlement tank, the filter apparatus comprising:
   a hollow hub portion having a horizontal axis through which machine tool coolant moves;
   a plurality of hollow disk filter elements each having a non-reticulated metal screen having a smooth planar surface having openings therein, rotatable about said axis and spaced along and in communication with the hollow of said hub portion for collecting on said surface contaminants from machine tool coolant moving, in a direction of movement, from outside each said filter element into the hollow of the hub portion thereof, said openings being hourglass in shape in the direction of movement; and
   doctor means for scraping each surface to remove collected contaminants from the surface of each said filter element.

* * * * *